Patented Sept. 12, 1933

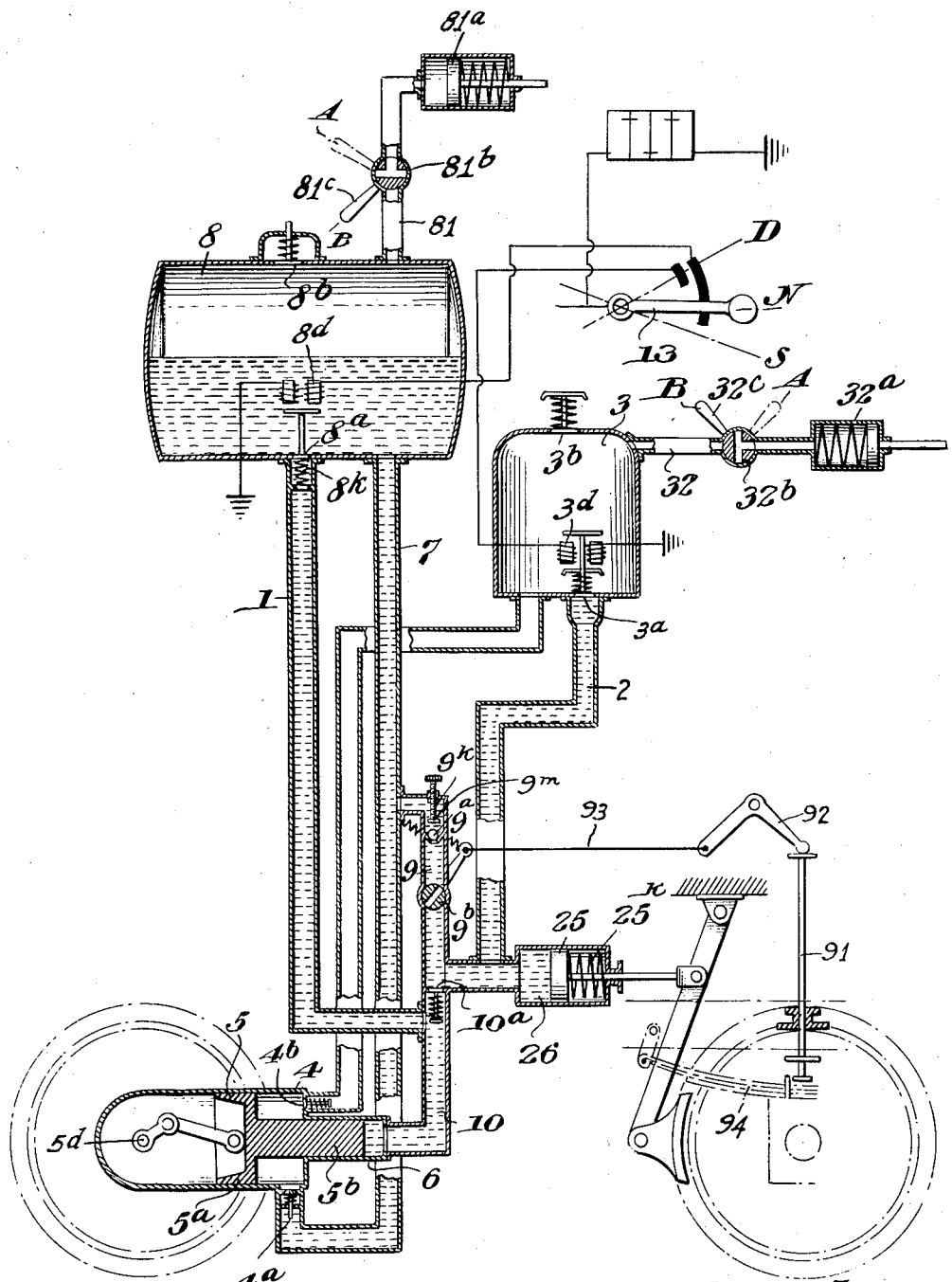

1,926,296

UNITED STATES PATENT OFFICE 1,926,296

HYDRO PNEUMATIC MOTOR

Charles Merchie, Brussels, Belgium, assignor to Compagnie Internationale Des Freins Automatiques, Société Anonyme, Liege, Belgium Application February 28, 1929. Serial No. 343,332

9 Claims. (Cl. 303—10)

The present invention relates to a hydro-pneumatic device particularly suitable for actuating vehicle brakes and comprising a recharging pump delivering a liquid coming from a discharge reservoir into a storage reservoir.

This arrangement provides a source of energy capable of being utilized by various motors which will be connected to suitable points of the apparatus, said motors being hereinafter termed main motors and auxiliary motors.

In the case of the application of the invention to vehicles such as tramway vehicles, the main motors will be formed by the brake cylinders, while the auxiliary motors actuate, for example, the doors of the vehicle or may be employed for the distant control of controlling devices such as the electric motor controllers in trains comprising several power vehicles, etc.

The invention proposes to attain the following objects either separately or in combination:

(a) The simultanenous use of hydraulic and pneumatic motors with an automatic charging of the energy reservoirs and no-load working of the recharging pump when this charging has been effected;

(b) In the case of use in actuating vehicle brakes, obtaining a braking action the intensity of which is a function of the speed and of the load of the vehicle; for which purpose the pump produces in the two above mentioned reservoirs, which are closed, a state of equilibrium for which there exists in the storage reservoir a certain pressure corresponding to a certain partial vacuum in the discharge reservoir, both depending in particular on the volume of the clearance in the pump.

In the case when one or more of the above mentioned hydraulic motors are employed for actuating the brake mechanism, the invention provides for a braking action to be obtained in two stages: the first stage during which the braking pressure in the motor is provided by the storage reservoir, and a second stage during which the motor receives an additional quantity of liquid which increases with increasing speeds of travel of the vehicle, thereby causing the pressure to increase with the speed of the vehicle.

The invention provides for the hydraulic or pneumatic motors to be arranged in parallel between the above mentioned storage and discharge reservoirs.

Moreover, if it is desired to obtain a braking action which will also be a function of the load on the vehicle by utilizing the variations in the yielding of the suspension springs of the vehicle in order to act upon a member of the brake, the invention provides for this member being a valve placed in a duct permitting the liquid to be discharged from the cylinder of the motor.

The accompanying drawing illustrates by way of example in a non-limiting manner, one embodiment of the invention. The latter also comprises the various original features which the arrangement shown embodies.

The single figure of said drawing is a diagrammatic view of the hydro-pneumatic motor, which actuates a brake rod of a vehicle.

When the installation is started, a certain quantity of liquid is placed in the closed discharge reservoir 3; and the recharging pump 4—5, after it has been started, delivers the whole of the liquid contained in the reservoir 3 into the closed storage reservoir 8 through the suction valve 4b and the delivery valve 4a. The parts 5a and 5b of the piston 5 of the recharging pump 4 are actuated by the axle 5d of the vehicle and are respectively moved in corresponding cylinders 4 and 6. It then draws in the gas contained in the latter and also delivers it into the reservoir 8 until the pressure in the clearance space of the recharging pump is equal to or less than the pressure existing in the reservoir 8. At this moment a state of equilibrium will exist in the system for which there will be in the discharge reservoir a certain partial vacuum corresponding to a certain pressure in the storage reservoir. During this period of equilibrium the suction valve 4b and delivery valve 4a of the recharging pump remain stationary and the latter works under no load.

This state of equilibrium may be broken either by admitting liquid or gas into the reservoir 3 or by removing liquid or gas from the reservoir 8. This may be effected in particular by connecting between the reservoirs 8 and 3 hydraulic or pneumatic motors which utilize liquid or gaseous fluid under pressure taken from the reservoir 8 and discharge this fluid after the work has been done into the reservoir 3.

The source of energy formed by the two reservoirs and the recharging pump may be employed for operating auxiliary pneumatic motors such as 81a employing air under pressure and discharging this air into the atmosphere after expansion. In this case it is necessary to reintroduce into the pump reservoir arrangement quantities of air corresponding to those utilized by the auxiliary motors and drawn from the reservoir 8 through the duct 81.

For this purpose an automatic valve 3b is mounted upon the reservoir 3, this valve opening towards the reservoir 3 and being so arranged that it opens only in order to allow atmospheric air to enter after a certain partial vacuum greater than that corresponding to the state of equilibrium exists in the reservoir. When the handle of the valve 81b which controls the auxiliary motor 81a is placed in the position shown in the drawing by dotted lines, some of the air which is under pressure in the reservoir 8 flows into this motor and determines its displacement. The result is that the pressure in the reservoir 8 diminishes and permits the delivery valve 4a to open during the compression stroke of the pump and permits the air to be sent into the reservoir 8; this increases the air pressure in the reservoir 8. The vacuum created by the pump during its suction stroke will be very great, and a certain quantity of air will be sucked by the pump out of the reservoir 3. The resultant decrease in pressure in the reservoir 3 will permit the intake into this reservoir, by means of the valve 3b, of a quantity of air corresponding to that sucked in by the pump. After the pump has operated some time, the pressure will have been reestablished by the air compressed by the pump, and the normal vacuum will prevail in the discharge reservoir 3 by the effect of the intake of air through the valve 3b. It is to be noted that this valve 3b will close again as soon as the pressure in the reservoir 8 has returned to its normal degree. The above mentioned state of equilibrium defined by the pressure existing in the recharging space of the pump will again exist until the moment when the auxiliary motor 81a utilizes a new quantity of air that causes the pressure to fall in the reservoir 8, which pressure is reestablished by the recharging pump.

Use may also be made of auxiliary motor such as 32a utilizing a vacuum. For this purpose these motors will be connected to the reservoir 3 through a handle valve 32b. The admission of air takes place in said reservoir 3 as a result of the operation of the auxiliary motor and is drawn in by the pump and delivered into the reservoir 8. In order to prevent the pressure in reservoir 8 from rising above the normal degree, said reservoir 8 is provided with a pressure regulator or spring loaded valve 8b opening towards the atmosphere.

The quantities of air which this regulator permits to escape correspond to the quantities of air introduced into the pump reservoir system by the operation of the auxiliary motor 32a. These motors 32a and 81a are controlled, respectively, by valves 32b and 81b having handles 32c and 81c: the dotted-line position A of said handles corresponding to the operation of the motors, and the full line position B corresponding to their release.

The main motor 25—26 actuates a brake mechanism, this motor being essentially composed of a brake cylinder 26 in which moves a piston 25 connected to the rigging and acted upon by a return spring 25k.

In order to produce a braking action, the current supplying the solenoid 8d which keeps the brake applying valve 8a upon its seat is cut off by means of the hand lever 13 which is moved into position S. This valve opens by the action of the pressure existing in the reservoir 8, and liquid flows through the ducts 1 and 10 and through an automatic valve 10a into the brake cylinder 26 which operates the brake. When the pressure in the cylinder is equal to that which exists in the reservoir 8, the brake applying valve 8a recloses under the action of its weak return spring 8k. These operations form the first stage of the braking action for which the intensity of the braking action is constant and equal to a determined degree.

As soon as the valve 8a has reclosed the part 5b of the piston which is moved in a cylinder 6 acts as an additional pump and draws liquid from the storage reservoir 8 through the medium of the ducts 10 and 1 and the valve 8a, which valve works as an automatic suction valve for this additional pump. This pump delivers the liquid into the brake cylinder 26 through the duct 10 and the valve 10a opening towards the cylinder 26, which valve works as automatic delivery valve for said additional pump.

The quantity of liquid sent through the automatic valve 10a is proportional to the speed of the pump, that is, to the speed of the vehicle on one of its axles 5d to which the additional pump 5b—6 is connected. This quantity of liquid returns to the storage reservoir 8 by means of valves 9a and 9b positioned in the conduit 9 as well as the upper part of the conduit 7. The valves are so constructed as to allow the liquid a reduced passageway. The pressure in the braking cylinder is then equal to the pressure in the charge reservoir and in the conduit 7 plus the loss of pressure which the liquid has undergone in its travel through the valves 9a and 9b. This loss of pressure depends on one hand on the flow of liquid, which flow is proportional to the speed of the vehicle, and on the other hand on the size of the passageway presented by the valves.

The valve 9a comprises an automatic valve opening toward the storage reservoir, and its movement is limited by a stop 9m provided at the end of a threaded screw 9k which screws into the wall of the conduit 9. By rotating the screw 9k, I can regulate the amount of opening of the valve 9a.

The valve 9b comprises a stop-cock, the rotation of which is effected by a cable 93 fixed to the end of a bent lever 92 pivoted on a stationary point and actuated by a rod 91 which is supported near the center of a suspension spring (shown in dotted lines at 94). The size of passageway afforded by the valve 9b is consequently proportional to the deformation of the suspension springs of the vehicle, or in other words, to the load on the vehicle. The pressure in the braking cylinder is therefore proportional to the load on the vehicle.

It is evident from the foregoing that starting from the closing of the valve 9a at the end of the first phase of braking, a second phase ensues in the course of which the pressure in the braking cylinder is proportional to the speed and to the load on the vehicle. In order to produce a release of the brakes, the hand lever 13 is moved into the position designated D in order to supply current to the solenoid (3d), the action of which has to be such as to repell the releasing valve 3a to open the same. As a result of this, the cylinder 26 is put into communication with the discharge reservoir 3 through the duct 2, and the return spring 25k of the piston 25 releases the brake.

In the drawing:

1. The conduit 1 is open at its lower right-hand portion and connects directly with the conduit 10.

2. The lower left-hand portion of the conduit 10 is open and feeds directly into the cylinder 6.

3. The conduit 7 has no connection with the cylinder 6.

4. The upper left-hand portion of the conduit 9 is open and leads directly into the conduit 7.

5. The conduit 1 has no relation with the conduit 7 nor with the conduit (having no reference character) connecting the reservoir 3 to the valve 4b of the cylinder 4.

6. The valve 4b opens toward the interior of the cylinder 4; the valve 4a opens toward the exterior of the cylinder 4; the valve 10a opens toward the interior of the cylinder 26.

Operation

The hand lever 13 being in the position S, the electromagnet 8d is deenergized and the valve 8a opens against the force of its spring 8k, under the action of the pressure prevailing in the storage reservoir 8. A portion of the liquid from the reservoir 8 flows through the ducts 1 and 10 through the valve 10a (which opens and compresses its spring) into the brake cylinder 26 to operate the brake. The piston 25 is displaced towards the right and compresses the brakes with a force corresponding to the pressure in the reservoir 8. At this instant there exists in the conduits 1, 10, 9, 2 and 7 and in the cylinders 6 and 26 a pressure equal to the pressure in the storage reservoir 8.

Meanwhile, if the pistons 5 and 5b are displaced toward the left:

(a) The piston 5 sucks air out of the reservoir 3 through the valve 4b. If the reservoir 3 contains liquid, the piston 5 sucks out a portion of this liquid.

(b) As a result of the displacement of the piston 5b toward the left, the cylinder 6 is filled with liquid coming through the conduits 10 and 1 from the storage reservoir 8. It should be noted that the piston 5b cannot suck liquid out of the cylinder 26, because the valve 10a acts as a non-return valve.

When the pistons 5 and 5b are displaced toward the right:

(a) The air or liquid which is contained in the cylinder 4 is driven back into the storage reservoir 8 by the piston 5 through the valve 4a into conduit 7.

(b) The liquid which fills the cylinder 6 is driven back into the conduit 10 by the piston 5b. This supplementary liquid cannot be driven back into the storage reservoir 8 because the valve 8a acts as a non-return valve. This liquid is then driven back into the brake cylinder 26 through the valve 10a. If the valve 3a is shut at the moment that the brakes are applied to the wheels, there results in the brake cylinder 26 a pressure higher than that of the storage reservoir 8; on account of the incompressibility of the liquid, it is necessary to permit the supplementary liquid to escape outside of the brake cylinder 26 so that the increased pressures will not burst the conduits or jam the piston 5b.

The escape passage for this supplemental liquid is effected by the members 9a and 9b, which permit a portion of the liquid from the brake cylinder 26 to pass from the conduits 9 and 7 into the storage reservoir 8.

It should be understood that the quantity of liquid which escapes through the members 9a and 9b is smaller than the section of passage permitted by these members; consequently, no matter how small the quantity of liquid which escapes, the pressure in the brake cylinder 26 is higher than the pressure in the conduit 7, that is, it is higher than the pressure in the storage reservoir 8.

It will be seen, therefore, that the first stage of the braking action depends on the pressure in the storage reservoir 8. Since the action of the pump 6 depends on the speed of the vehicle, the second stage of the braking action of the brake cylinder 26 will depend on the speed of the vehicle as a factor. In addition, the weight of the vehicle is transmitted mechanically to the valve 9b to regulate the opening in the duct 9 in the return path of the liquid from the brake cylinder 26 to the reservoir 8. The regulation of the opening of the duct 9 is such that it is proportional to the weight of the vehicle, so that the second stage of the braking action is not only proportional to the speed of the vehicle but also to its weight.

The auxiliary motor 32a is operated by means of the handle 32b to open or shut doors or similar devices. The same is true of the auxiliary motor 81a. Both of these make use of the vacuum or pressure in the respective reservoirs 3 and 8.

What I claim is:

1. A hydro-pneumatic device for the braking of vehicles, comprising: a storage reservoir containing liquid and gas under pressure; a discharge reservoir containing a certain vacuum; a pump maintaining a predetermined value between the pressures of the two reservoirs; a plurality of distinct motors disposed in parallel between said reservoirs, one operated by the liquid under pressure, and the other by the gas; and means for restoring to the storage reservoir the liquid and the gas which have operated said motors.

2. A hydro-pneumatic device for the braking of vehicles, comprising: a storage reservoir containing liquid and gas under pressure; a discharge reservoir containing a certain vacuum; a pump maintaining a predetermined value between the pressures of the two reservoirs; a plurality of distinct motors, one operated by means of the air under pressure of the storage reservoir, and the other by means of a vacuum of the discharge reservoir; and means for discharging to the atmosphere through the storage reservoir, by the said pump, quantities of air corresponding to those which have operated the motor actuated by the vacuum of the discharge reservoir.

3. A hydro-pneumatic device for the braking of vehicles, comprising: a storage reservoir containing liquid and gas under pressure; a discharge reservoir containing a certain vacuum; a pump maintaining a predetermined value between the pressures of the two reservoirs; a plurality of distinct motors, one operated by means of the air under pressure of the storage reservoir, and the other by means of the vacuum of the discharge reservoir; and means for returning to the storage reservoir, by said pump exhausting to the atmosphere, quantities of air corresponding to those utilized by the motor operated by means of the air under pressure of the storage reservoir.

4. A hydro-pneumatic device for the braking of vehicles, comprising: a storage reservoir containing liquid and gas under pressure; a discharge reservoir; a pump to force back into the storage reservoir the liquid from the discharge reservoir; a hydraulic motor; means for operating the motor during a part of its stroke by the liquid under pressure of the storage reservoir; and means for operating said motor during the other part of its stroke by the combined action of said liquid under pressure and a supplemental quantity of liquid corresponding to the speed of the vehicle.

5. A hydro-pneumatic device for the braking of vehicles, comprising: a storage reservoir containing liquid and gas under pressure; a discharge reservoir; a pump to force back into the storage reservoir the liquid from the discharge reservoir; a hydraulic motor; means for operating the motor during a part of its stroke by the liquid under pressure of the storage reservoir; means for operating said motor during the other part of its stroke by the combined action of said liquid under pressure and a supplemental quantity of liquid corresponding to the load and to the speed of the vehicle.

6. A hydro-pneumatic device for the braking of vehicles, comprising: a storage reservoir containing liquid and gas under pressure; a discharge reservoir; a pump to force back into the storage reservoir the liquid from the discharge reservoir; a hydraulic motor; means for operating the motor during a part of its stroke by the liquid under pressure of the storage reservoir; and a supplemental pump, operated by one of the axles of the vehicle, for driving back into the motor a supplemental quantity of liquid corresponding to the speed of the vehicle.

7. A hydro-pneumatic device for the braking of vehicles, comprising: a storage reservoir containing liquid and gas under pressure; a discharge reservoir; a pump to force back into the storage reservoir the liquid from the discharge reservoir; a hydraulic motor; means for operating said motor during a part of its stroke by the liquid under pressure of the storage reservoir; means for imparting to said liquid a pressure corresponding to the speed of the vehicle; a by-pass between the cylinder of said motor and the storage reservoir; a valve in said by-pass opening automatically toward the outside of said cylinder; and a stop limiting the stroke of said valve, so that the section of passage for the liquid may remain approximately constant during the flow of said liquid.

8. A hydro-pneumatic device for the braking of vehicles, comprising: a storage reservoir containing liquid and gas under pressure; a discharge reservoir; a pump to force back into the storage reservoir the liquid from the discharge reservoir; a hydraulic motor; means for operating said motor during a part of its stroke by the liquid under pressure of the storage reservoir; means for imparting to said liquid a pressure corresponding to the speed of the vehicle; a by-pass between the cylinder of said motor and the storage reservoir; a valve in said by-pass opening automatically toward the outside of said cylinder; and means for acting on said valve in function of the variations in the yielding of the suspension springs of the vehicle.

9. A hydro-pneumatic device for the braking of vehicles, comprising: a storage reservoir containing liquid and gas under pressure; a discharge reservoir; a pump to force back into the storage reservoir the liquid from the discharge reservoir; a plurality of pneumatic motors, one operated by the air under pressure from the storage reservoir, and the other by the vacuum of the discharge reservoir; a hydraulic motor operated by the liquid under pressure of the storage reservoir; and an auxiliary pump to effect the operation of the hydraulic motor by the liquid in two stages, in one of which the pressure of the liquid acting in the hydraulic motor corresponds to the speed of the vehicle, the first-named pump and the auxiliary pump jointly forming a single body which comprises two parts moving, respectively, in corresponding cylinders.

CHARLES MERCHIE.